July 12, 1927.

J. ROBINSON 1,635,345

AUTOMATIC TRAIN PIPE COUPLING

Original Filed Nov. 22, 1920    3 Sheets-Sheet 2

INVENTOR
Joseph Robinson,
BY Watson, Coit,
Morse & Grindle,
ATTORNEYS.

July 12, 1927.

J. ROBINSON 1,635,345

AUTOMATIC TRAIN PIPE COUPLING

Original Filed Nov. 22. 1920   3 Sheets-Sheet 3

INVENTOR
Joseph Robinson,
BY Watson, Coit
Morse & Grindle,
ATTORNEYS.

Patented July 12, 1927.

1,635,345

UNITED STATES PATENT OFFICE.

JOSEPH ROBINSON, OF NEW YORK, N. Y.

AUTOMATIC TRAIN-PIPE COUPLING.

Application filed November 22, 1920, Serial No. 425,765. Renewed November 12, 1925.

My invention relates to improvements in automatic train pipe couplings, and has among its objects to provide an improved train pipe coupling in which no rubber or fabric hose is used to convey the fluid from the train pipe to the connector. Experience has proved the rubber hose, commonly used for this purpose, to be unreliable and comparatively short-lived. In addition, it is expensive, and is apt to burst at any time with serious consequences. An automatic train pipe coupling in which no rubber or fabric hose is used, is free from these objections, and produces a construction of great dependability and lasting endurance.

With this and other objects in view my improvment consists in the combinations, arrangements, and constructions hereinafter described, pointed out in the appended claims, and illustrated in the accompanying drawings in which Figure 1 is a side elevation of my improvement showing a portion of the usual car coupler C, and a part of the usual metallic train pipe F.

Figure 1:
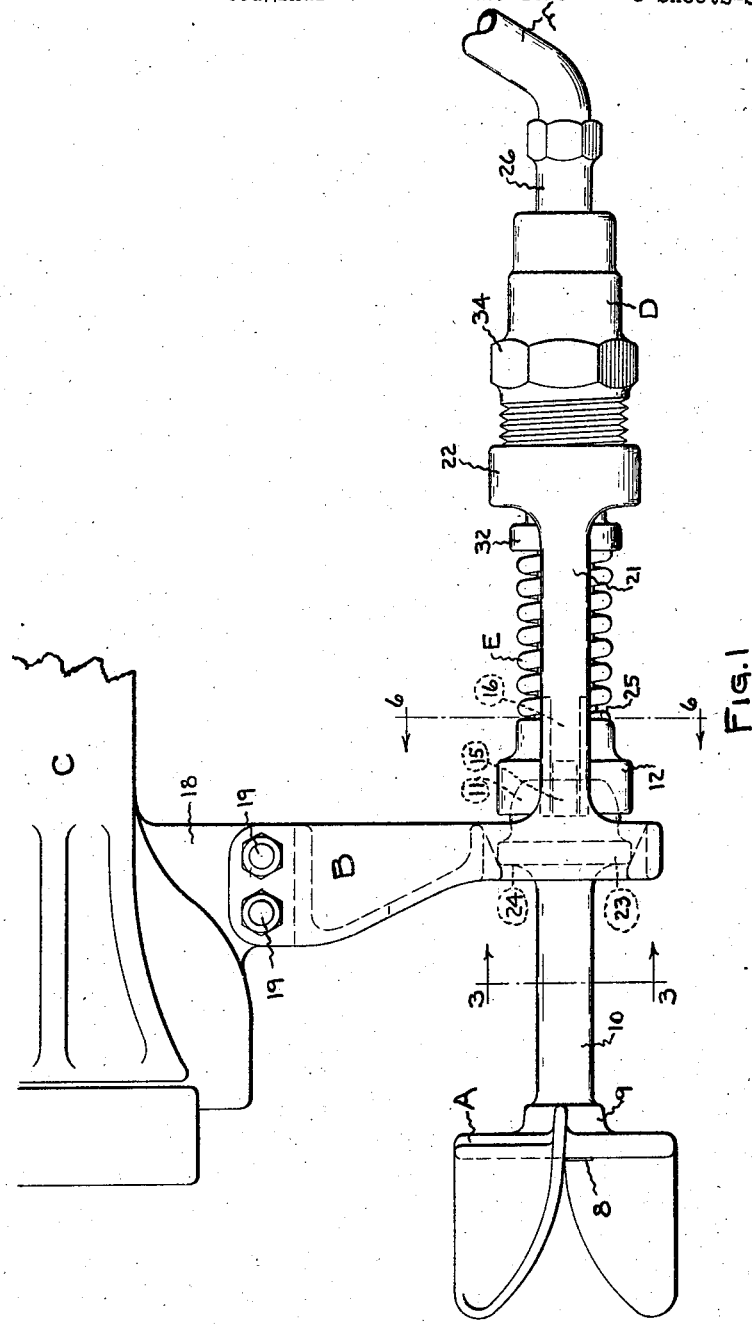

Referring now to the drawings: My invention comprises the usual coupling head A, in which is suitably mounted any desired form of gasket 8, which projects slightly in advance of the coupling face of the head, and is adapted to make a butt joint with a complementary gasket in a counterpart head. The coupling head B is provided with a shank or nipple 9, threaded as shown, particularly in Figure 2. A hollow member or fluid conduit 10, is threadingly connected at its forward end to the shank 9 of the coupling head, and terminates at its rear end in a semi-spherical or ball portion, or bearing, 11 adapted to fit within a complementarily shaped enlarged head or socket 12 of a second conduit or member 13.

Figure 2:
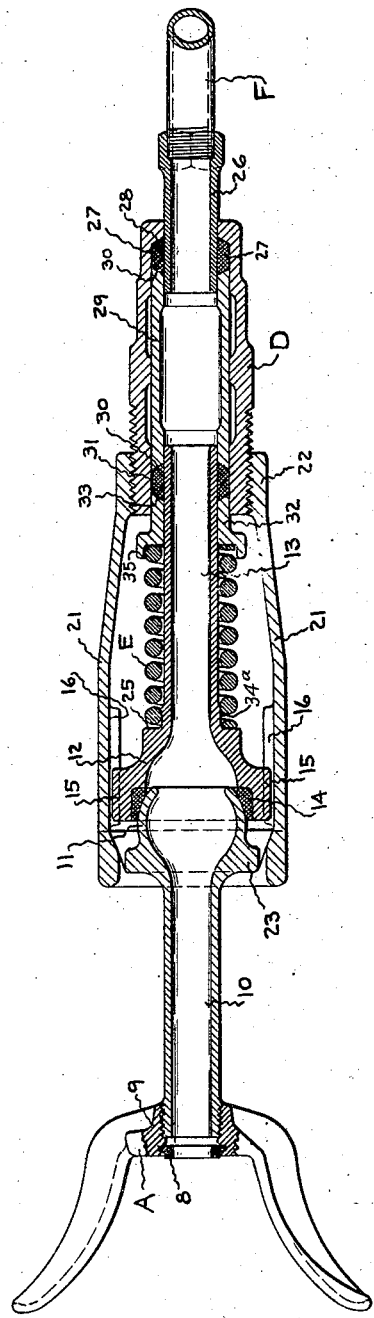
Figure 2 is a sectional plan view through my improvement, showing in elevation a portion of the metallic train pipe F.
Figure 3:
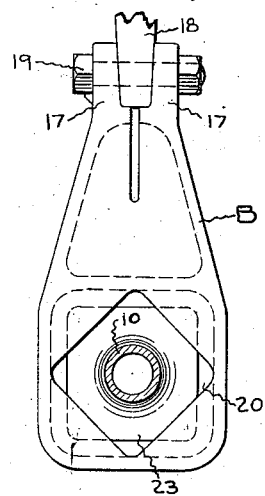
Figure 3 is a front view of my improvment taken on the line 3—3 of Figure 1.

The connection between the ball or bearing member 11, and the socket member 12 must, of course, be fluid tight, and to this end I mount in the socket 12, a suitable annular packing 14, the inner face of which is formed to snugly receive the ball 11 of the member 10, as shown particularly in Figure 2. Upon diametrically opposite sides of the socket member 12, I provide it with lugs or projections 15 which slidingly fit within grooves 16 of the bracket B and which in co-operation with such grooves, serve to maintain the socket portion in the service position. The bracket B comprises a one piece member terminating at its upper end in ears 17 which suitably span the usual lug 18 on the coupler C, and are clamped thereto as by bolts 19. The lower end of the bracket is provided with a rectangularly shaped opening 20, Figures 3 and 4, formed with two of its diametrically opposite corners disposed on substantially the vertical center line of the bracket, the bracket is also provided with a rearwardly extending projection or yoke comprising spaced straps 21, which terminate at their rear end in a threaded collar 22. The ribs may, of course, be connected with the bracket B, and with the collar 22, in any suitable manner, but I preferably form them integral therewith.

Figure 4:
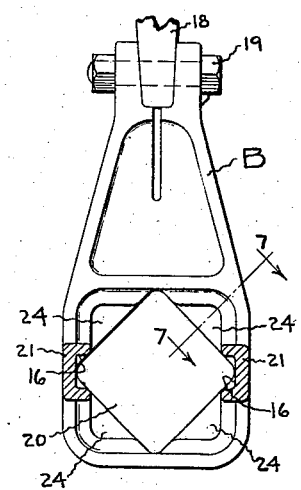
Figure 4 is a rear view of the bracket member B of my improvement showing a portion thereof in section.
Figure 5:
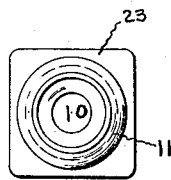
Figure 5 is a rear view of the ball member and its flange of the universal joint of my improvement.
Figure 6:
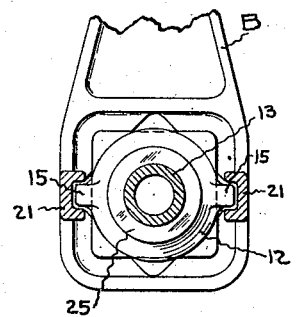
Figure 6 is a rear view of my improvement taken on the line 6—6, Figure 1 and showing a part of the bracket B broken away.
Figure 7:
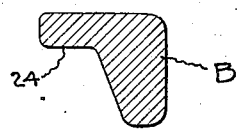
Figure 7 is an enlarged detail taken approximately on the line 7—7 of Figure 4 and showing the shape of the bracket B at that point.

As will appear from Figures 1 and 2 the fluid conduit or pipe 10 projects through the opening 20 in the bracket B and is provided with a flange or projection 23, preferably formed integral with the pipe 10 and adjacent the semi-spherical or ball portion 11, which flange normally engages and bears upon the rear face of the bracket B as at 24, Figures 4, 6 and 7. The socket portion or head 12 lies between the straps 21 of the bracket, and has a shank 13 which extends rearwardly from an annular shoulder or seat 25 formed on the rear side of the member or socket portion 12.

Within the collar 22 I adjustably mount, as by threads as shown, a chamber or sleeve D of any desired shape, preferably cylindrical, the sleeve surrounds the shank 13 and slidingly receives the same, and is open at its rear end as shown in Figure 2. Projecting through this opening into the sleeve I provide a metallic nipple 26, and this I surround with a suitable packing 27 which as shown in Figure 2 bears upon a tapered seat 28 at the rear end of the sleeve and serves to prevent the fluid in the sleeve from escaping around the nipple 26. Extending from this packing forwardly I provide a thimble or follower 29, each end of which is tapered as shown at 30. The forward end of the thimble surrounds the shank 13 of the member 12, and abuts a suitable packing 31 which surrounds the shank 13 of the member 12. Abutting the front face of the packing 31 I provide a spring seat or gland 32, the rear end of which has a tapered face 33 adapted to bear upon the packing 31, as shown. Between the seat or gland 32 and the annular seat 25 of the member 12, and surrounding the shank 13, I mount a cylindrical buffer spring E which serves to project the member 12 into tight engagement with the ball portion 11 of the pipe 10 and to maintain the flange 23 firmly but yieldingly pressed against the rear face 24 of the bracket B, and thus yieldingly sustain the coupling head A at the limit of its forward movement, and in the normal horizontal position. The spring E is, of course, normally under sufficient compression for this purpose, which compression may be increased or decreased by rotating the sleeve or stuffing box D forward or back through the medium of a wrench or other means applied to the hexagonal or other suitably shaped portion 34 thereof. It will be observed that the resistance of the spring E is not only directed to the purpose of yieldingly supporting the coupling head A, but also to the function of placing the packings 27 and 31 of the stuffing box D and the packing 14 of the universal joint formed by the ball and socket members 11 and 12 of my improvement, under constant pressure. It serves also to automatically adjust these parts to compensate for the wear occurring in service, and thus efficiently maintain a fluid tight connection between the parts of the stuffing box D, and the aforesaid universal joint, at all times. The joint formed by the sleeve D and the parts operating within it, may be regarded as an expansion joint since its principal function is to permit of linear movement between the shank 13 and the nipple 26 without the escape of fluid from the thimble 29. The shank 13 is provided at its forward end with a raised portion 34a adapted, in cooperation with the flange 35 of the seat or gland 32 to hold the spring E out of contact with the shank during this movement, and thus avoid objectionable wear on the shank.

It will be understood that the train pipe F may be of any desired form, and may lead from any portion of the car to the nipple 26 of my improvement. The sliding joint formed between the nipple 26 and the sleeve or stuffing box D, allows my improvement to accommodate itself to the relative movement between the car coupler and the car occasioned by the running in and out of the cars in service, while the joint formed by the packing 31 and the shank 13 permits the coupling head A to move longitudinally of the car coupler the extent required to place the spring B under proper compression. The universal movement necessary to adjust the coupling head A to the various angular positions it must assume in service, as aforesaid, is freely permitted by the universal joint formed by the members 11 and 12, the packing 14 thereof serving to reduce the frictional resistance to this movement.

Thus I provide a simple and efficient automatic train pipe coupling in which the use of fabric or rubber hose is entirely eliminated, and in which all the positions such couplings must assume in service is efficiently provided for in such a manner as to permit of the movement without undue stress or strain upon any of the parts, and without the escape of fluid from any of the joints. Employing the buffer spring E to automatically pack the stuffing box and the universal joint of my improvement produces a particularly efficient, simple, and effective expansion joint construction which requires the minimum amount of upkeep attention, and in which the possibility of the escape of fluid due to a poorly or infrequently packed joint is entirely eliminated.

The various parts of my invention are, of course, so proportioned and arranged as to allow it to readily accommodate itself to all the positions required by service, and so as to permit of ready and simple assembly.

What I claim is:

1. In an automatic train pipe coupling, the combination with a coupling head and a suitable supporting bracket therefor, of a universal joint for yieldingly supporting said head for free universal movement relative to the bracket, said joint comprising a plurality of flexibly connected metallic fluid conduits lying substantially in the horizontal plane, one of said conduits being connected with said coupling head and movable universally therewith relative to the other conduit and to said bracket, and each of the conduits being shiftable longitudinally of the bracket, said conduit which is connected to the head having a part adapted to contact with a part of the bracket for maintaining the head in position to engage a mating head, and yieldable means for holding said parts together when the head is free from a mating head.

2. In an automatic train pipe coupling, the combination of a coupling head, a bracket, and a hollow universal joint shiftable longitudinally in the bracket and serving to permit universal movement of said head and to conduct a fluid thereto, said head having a part rigid therewith and arranged to contact with a part of the bracket for maintaining the head in position to engage the mating head, and yieldable means for holding said parts together when the head is free from a mating head.

3. In an automatic train pipe coupling, the combination of a coupling head, a bracket, a hollow conduit connected with said head and extending rearward thereof to said bracket and serving to conduct a fluid to the head, a projection on said conduit adapted normally to rest against said bracket, a second conduit upon the forward end of which said first mentioned conduit may move universally, and a spring for maintaining said conduits in engagement with said projection bearing upon said bracket.

4. In an automatic train pipe coupling, the combination of a coupling head, a bracket, a hollow conduit connected with said head and extending rearwardly thereof to said bracket and serving to conduct a fluid to the head, a projection on said conduit adapted normally to rest against said bracket, a second conduit upon the forward end of which said first mentioned conduit may move universally, and a spring for maintaining said conduits in fluid tight engagement with said projection bearing upon said bracket.

5. In an automatic train pipe coupling, the combination of a coupling head, a bracket at the rear of said head, a conduit connected with the head and extending through said bracket to the rear thereof and serving to conduct a fluid to said head, said conduit comprising a plurality of members connected together by a universal joint which permits universal movement to said coupling head, one member of said joint being provided with a projection which normally bears against said bracket to limit the forward movement of the coupling head relative to the bracket, and means for yieldingly maintaining said projection in such engagement.

6. In an automatic train pipe coupling, the combination of a coupling head, a bracket, a fluid tight universal joint shiftable longitudinally relative to said bracket and adapted to permit free universal movement to said coupling head and to convey a fluid thereto, means co-operating with said joint to yieldingly support the head, an expansion joint, and means between the expansion joint and said universal joint to automatically pack both of said joints.

7. In an automatic train pipe coupling, the combination of a coupling head, a bracket, a fluid tight universal joint shiftable longitudinally in the bracket and adapted to permit universal movement to said head, said joint comprising a plurality of fluid conduits mounted for relative movement and having communication with said head and serving to convey a fluid thereto, one of the conduits being provided with a socket and another with a portion fitting said socket and movable therein, a second joint at the rear of said universal joint, and means between said universal joint and said second joint adapted to automatically pack the joint.

8. In an automatic train pipe coupling, the combination of a coupling head, a hollow bracket, a fluid conduit connected with said head and extending rearward through said bracket and carrying a bearing, a projection on said conduit adjacent to said bearing and adapted normally to engage said bracket, means to yieldingly maintain said projection in such engagement to yieldingly sustain said coupling head, a second conduit one end of which is mounted on said bearing and relative to which end said first mentioned conduit and said coupling head may move universally, a second joint comprising a sleeve and the rear end of said second conduit, a suitable packing for said second joint, and automatically acting means between said packing and said bearing for exerting pressure upon both the bearing and the packing to pack said joints.

9. In an automatic train pipe coupling, the combination of a coupling head, a bracket having an opening in its lower end, a plurality of fluid conduits connected by a universal joint which joint lies at the rear of said opening and is adapted to move away from the opening and to permit universal movement to said coupling head, one of said conduits being connected with said head and serving to support the same in front of said bracket and a second one of which conduits extends rearward from said universal joint, a train pipe, an expansion joint connecting said train pipe and the rearwardly extending conduit, and means between the expansion joint and said universal joint for packing the joint and for yieldingly resisting movement of said coupling head.

10. In an automatic train pipe coupling, the combination of a coupling head, a bracket having a perforated lower end and a perforated projection connected with such end, an expansion joint mounted in the opening in said projection, a conduit extending into said expansion joint and projecting forward thereof and having a bearing, a fluid conducting member mounted on said bearing for universal movement thereon and extending forward thereof through the opening in the lower end of said bracket and into engagement with said coupling head, a packing for said bearing and said expansion joint, and means interposed between the bearing and the expansion joint to exert pressure on said packing and to yieldingly sustain said coupling head.

11. In an automatic train pipe coupling, the combination of a coupling head, a bracket having a perforated lower end and a perforated projection connected with such end, an expansion joint mounted in the opening in said projection, a conduit extending into said expansion joint and projecting forward thereof and having a bearing, a fluid conducting member mounted on said bearing for universal movement thereon and extending forward thereof through the opening in the lower end of said bracket and into engagement with said coupling head, a packing for said bearing and said expansion joint, a spring interposed between the bearing and the expansion joint to exert pressure on said packing and to yieldingly sustain said coupling head, and means for varying the pressure of said spring.

12. In an automatic train pipe coupling, the combination of a coupling head, a bracket having a perforated lower end and a perforated projection connected with such end, an expansion joint mounted in the opening in said projection, a conduit extending into said expansion joint and projecting forward thereof and having a bearing, a fluid conducting member mounted on said bearing for universal movement thereon and extending forward thereof through the opening in the lower end of said bracket and into engagement with said coupling head, a suitable packing for said bearing and said expansion joint, a spring interposed between the bearing and the expansion joint to exert pressure on said packing and to yieldingly sustain said coupling head, and means for varying the pressure of said spring, said means comprising an adjustable connection between said expansion joint and said projection whereby the expansion joint may be adjusted forward or backward to increase or decrease the compression of said spring.

13. In an automatic train pipe coupling, the combination of a coupling head carrying a gasket adapted to engage a gasket in a counterpart head, a bracket, a fluid tight universal joint carried by said bracket and adapted to convey a fluid to said head and to permit universal movement of the head, an expansion joint, a packing in each of said joints, and a common resilient means for placing said packings and said gasket under pressure and for yieldingly sustaining said coupling head.

14. In an automatic train pipe coupling, the combination of a coupling head, a supporting bracket therefor open at its lower end, a yoke extending rearwardly of the bracket from said lower end and terminating in a collar, a universal joint comprising a ball and socket which normally rest at the rear of said opening, a pair of fluid conducting members connected with said ball and socket, one of which members projects through said opening and the other of which extends rearward into said collar, a sleeve adjustably mounted in said collar and surrounding a portion of the rearwardly extending member, a train pipe extending into said sleeve, a suitable packing for said universal joint and said sleeve, and resilient means interposed between said sleeve and said universal joint for maintaining said packing in fluid tight relation to said joint and said sleeve.

15. In an automatic train pipe coupling, the combination of a coupling head, supporting means for said head including a bracket open at its lower end, a yoke extending rearward of the bracket from said lower end and terminating in a collar, a universal joint comprising a ball and socket resting normally at the rear of said opening, a member connected to said ball and extending through said opening into engagement with said coupling head for directing a fluid to the head, a fluid conduit extending rearward from said socket into said collar, a chamber surrounding the rear end of said conduit and adjustably mounted in the collar, a train pipe extending into said chamber, a suitable packing in said universal joint and said chamber, and means for maintaining said packing in fluid tight relation to said joint and said chamber, said means comprising a spring interposed between said chamber and said universal joint and surrounding said conduit and tending constantly to exert pressure upon said packing whereby the packing is automatically adjusted to compensate for wear occurring thereon, the extent of such pressure being variable by rotating the chamber.

16. In an automatic train pipe coupling, the combination of a coupling head, a bracket having an opening in its lower end, a chamber connected with said bracket and lying at the rear of said opening, a fluid conduit comprising a pair of metallic pipes the opposing ends of which are joined by a universal joint which serves to convey a fluid to said coupling head and to permit universal movement to the head, one member of which conduit extends through the opening in said bracket and the other member of which extends rearward into said chamber and has fluid tight reciprocal connection therewith.

17. In an automatic train pipe coupling, in combination, a bracket, a coupling head, a fluid conduit connected to said head and extending rearwardly past said bracket, a second conduit connected to said first conduit, said first conduit being movable universally relative to the second conduit, said conduits being shiftable rearwardly relative to said bracket when said head is coupled with a mating head, and a spring for yieldingly resisting such shifting of said conduits.

18. In an automatic train pipe coupling, in combination, a bracket, a coupling head, a fluid conduit shiftable axially in said bracket, a second fluid conduit connected to said head and extending rearwardly thereof and pivotally connected to said first conduit, said second conduit having a portion adapted to contact with said bracket and a spring for yieldingly resisting the axial shifting of said first conduit and for holding said portion of said second conduit against the bracket in the normal uncoupled position of said head.

19. In an automatic train pipe coupling, in combination, a coupling head, means for supporting the same for universal movement, said means comprising a conduit shiftable axially in said supporting means, a second conduit connected at one end to said head and pivotally connected at its other end to said first conduit, said second conduit and said supporting means having parts adapted to contact to support the head where the same is not coupled to a mating head and a spring for yieldingly resisting the axial shifting of said first conduit and for maintaining said parts incontact in the uncoupled position of the head.

20. In an automatic train pipe coupling, in combination, a bracket having at its lower end a horizontally arranged portion, a conduit slidably supported in such horizontally arranged portion of the bracket, a coupling head, a conduit connected thereto and extending rearwardly and connected to said first named conduit so as to have universal movement relative to said first named conduit, said first named conduit having a portion adapted to contact with a portion of said bracket, and a spring for resisting slidable movement of said first named conduit in the bracket, said spring serving to normally hold said contacting portions of said second conduit and said bracket together.

21. In an automatic train pipe coupling, the combination of a coupling head, a bracket having an opening, a conduit connected to said head and extending rearwardly into the opening in said bracket, a second conduit slidably mounted in said bracket, said conduits being connected to each other by a universal joint, whereby said head is free to move universally relative to said bracket.

22. In an automatic train pipe coupling, the combination of a coupling head, a bracket having an opening therein, a conduit connected to said head and extending rearwardly into said opening, a second conduit slidably mounted in said bracket, a coiled spring surrounding said last named conduit and normally pressing the same toward said head, said conduits being connected to each other by a joint which permits universal movement of said head relative to said bracket.

In testimony whereof I hereby affix my signature.

JOSEPH ROBINSON.